350-6.4

OR 3,617,106

United States

[11] 3,617,106

| [72] | Inventor | Nils Arvid Norman Bjork<br>Enebyberg, Sweden |
|---|---|---|
| [21] | Appl. No. | 786,969 |
| [22] | Filed | Dec. 26, 1968 |
| [45] | Patented | Nov. 2, 1971 |
| [73] | Assignee | Aga Aktiebolag<br>Lidingo, Sweden |
| [32] | Priority | Dec. 28, 1967 |
| [33] | | Sweden |
| [31] | | 17889/1967 |

[54] HIGH-EFFICIENCY SCANNING DEVICE FOR SCANNING A FIELD IN TWO DIRECTIONS
2 Claims, 2 Drawing Figs.

[52] U.S. Cl. .................................................. 350/7,
  178/7.6, 250/236
[51] Int. Cl. ............................................ G02b 17/00
[50] Field of Search ................................... 350/6, 7,
  285; 178/7.6; 250/236; 352/113; 95/4.5

[56] References Cited
UNITED STATES PATENTS

| 2,222,937 | 11/1940 | Dimmick | 178/7.6 |
|---|---|---|---|
| 2,543,463 | 2/1951 | Malm | 178/7.6 X |
| 3,217,623 | 11/1965 | Hotchkiss | 350/285 UX |
| 3,253,498 | 5/1966 | Lindberg et al. | 250/236 |
| 3,511,551 | 5/1970 | Matulka | 350/6 |

FOREIGN PATENTS

| 890,379 | 2/1962 | Great Britain | 350/7 |

*Primary Examiner*—David Schonberg
*Assistant Examiner*—Michael J. Tokar
*Attorney*—Larson, Taylor & Hinds ABSTRACT: In a large-aperture scanning system for infrared light, the incoming light passes from the objective through a pair of scanning prisms rotating on axes that intersect the optical axis and are mutually perpendicular. After passage through the prisms, the light is focused by an optical system onto a pickup device. To provide good scanning efficiency, the image of the pickup device is placed inside the inner prism and the image of the scanned field formed by the objective is made to fall just outside the outer prism, the two images being substantially equally spaced from the path described by the edge of the respective prisms upon rotation.

PATENTED NOV 2 1971 3,617,106

INVENTOR
NILS ARVID NORMAN BJÖRK

BY Larson and Taylor
ATTORNEYS

HIGH-EFFICIENCY SCANNING DEVICE FOR SCANNING A FIELD IN TWO DIRECTIONS

BACKGROUND OF THE INVENTION

The invention relates to a system for infrared light, the incoming light passing from the objective through scanning prisms rotating on axes that intersect the optical axis and are mutually perpendicular. Behind the first prism there is a light-sensitive device and between it and the prism an optical system for collecting the received light. The second prism receives the radiation collected by the objective. The scanning arrangement can also be used for emitting a beam of light.

It is known from U.S. Pat. No. 2,222,937 to use a pair of prisms for scanning in two mutually perpendicular directions with the aid of a narrow beam of light. In many applications, however, it is necessary to use highly convergent beams, i.e., the system must have a large aperture, for instance, in light pickup devices for visible or infrared light, where a high sensitivity is required. The rotating prisms then have to handle converging or diverging beams. The efficiency of the scanning requires the switching-over intervals to be as short as possible.

U.S. Pat. No. 3,253,498 describes a scanning arrangement having one rotating prism and in which the picked-up radiation is collected to a point just outside the prism, where the light-responsive device is located. If an additional prism is placed between the objective and the first prism to provide scanning in another direction, the resulting scanning efficiency will be low, because the additional prism will have to handle a wide beam and spend considerable time in removing one surface and introducing another into the beam.

SUMMARY OF THE INVENTION

It is an object of the invention to provide a scanning system of high efficiency. This is achieved by means of an arrangement comprising a light device, a first optical system, a second optical system coaxial with said first optical system, a first rotatable scanning prism having its axis perpendicular to the optical axis of said first and second optical systems and a second rotatable scanning prism having its axis perpendicular to that of said first prism and to that of said optical axis. The first optical system forms an image of the light device at a first image point within the first rotatable scanning prism while the second optical system forms an image of a point of the field at a second point within the second rotatable scanning prism. The second rotatable scanning prism effects a displacement of the second image point to a third image point outside the second rotatable prism. The arrangement of the invention is further characterized in that the first and third image points are substantially equally spaced from the path described by the edge of the first and second prisms, respectively, during rotation.

DESCRIPTION OF THE PREFERRED EMBODIMENT

Figure 1:
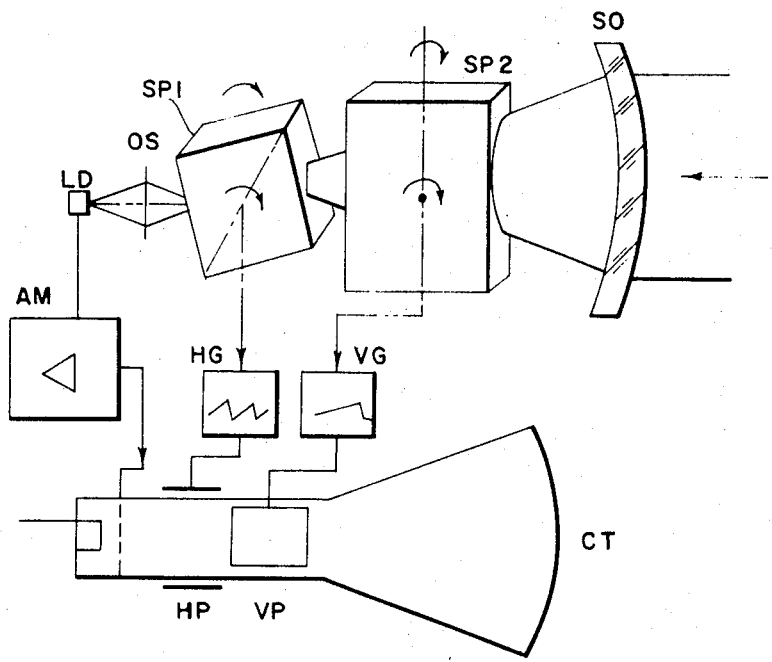
FIG. 1 is a schematic diagram illustrating a preferred embodiment of the invention.

In FIG. 1, LD designates a light pickup device receiving infrared or visible radiation through a converging optical system OS by way of a first and a second scanning prism SP1 and SP2. The prisms receive light from a second converging optical system SO. The prisms have axes of rotation which are mutually perpendicular and each of which is also perpendicular to the optical axis A of the converging systems.

Owing to the rotation of the prisms about their axes, there will be produced scanning movements in mutually perpendicular directions. If one prism has a speed which is several times that of the other, there is produced a line raster of the well-known television type and a two-dimensional display of the strength of the radiation within the scanned field may be produced as indicated in FIG. 1. CT is a cathode-ray tube having the deflecting electrode systems HP and VP for horizontal and vertical deflection of the beam. Coordinated with the deflecting systems are corresponding sawtooth generators HG and VG which are synchronized with the prisms SP1 and SP2, respectively. The output signal from LD is supplied to an amplifier AM, the output of which is applied to the grid of CT, whereby the length of the beam is varied in proportion to that of the received radiation.

Figure 2:
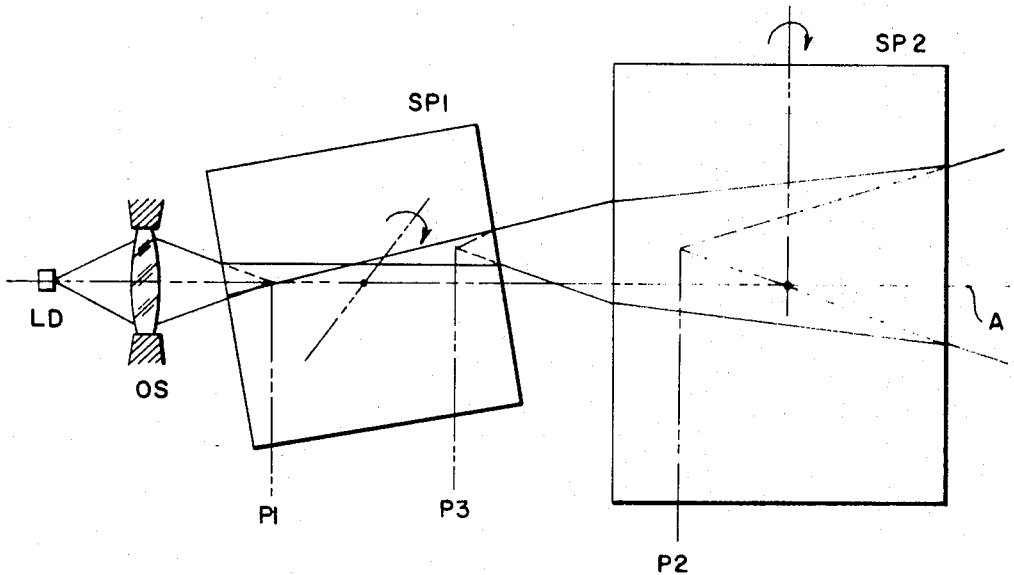
FIG. 2 is a more detailed diagram illustrating the operation of the scanning prism.

FIG. 2 illustrates the operation of the optical scanning system. The converging beam from SO images the scanning field at a point P2 within the second prism SP2. The prism causes the image point to be displaced to P3. The length of this displacement in the direction of the optical axis A is approximately constant during the rotation of SP2. The rotation causes displacement of P3 in a direction perpendicular to the plane of the drawing. This is the scanning movement in the vertical direction, it being assumed that the axis of rotation of SP2 is horizontal.

The light device LD is imaged by OS at a first image point P1 within the first prism SP1. The axis of rotation of SP1 is perpendicular to the plane of the drawing and the rotation of this prism causes P2 to be displaced parallel to the plane of the drawing. This is the scanning movement in the horizontal direction.

To obtain good scanning efficiency, it is essential that the time spent by the edge of a prism traversing the divergent beam from P1 or the beam convergent to P2 should be as short as possible. The edges of the prisms describe circular (cylindrical) paths during the rotation, and for the resulting efficiency from the combination of both prisms to be good, P1 should be about as far inside from the circular path of SP1 as P3 is outside that of SP2. If the prisms are placed close together, as shown in the drawing, P1 and P3 should be approximately symmetrical relative to the axis of rotation of SP1.

If P1 and P2 were closer to OS, SP1 would have to cut through a much wider beam and the efficiency would be reduced for the vertical scanning, although a slightly better efficiency would be obtained for the horizontal scanning. Correspondingly, if P1 and P2 were farther from OS, the vertical scanning efficiency would be improved at the expense of the horizontal. The best compromise is obtained in accordance with the rule stated above.

It is preferably to choose a value of refractive index for the prisms between 2 and 5, since the aberration caused by the prisms will otherwise be excessive.

It is claimed:

1. A high-efficiency scanning device for scanning a field in two mutually perpendicular directions comprising a first lens system, a second lens system, a first rotatable scanning prism and a second rotatable scanning prism, said scanning prisms being placed between said first and second lens systems, said first rotatable scanning prism having its axis of rotation perpendicular to said optical axis and said second rotatable scanning prism having its axis of rotation perpendicular to that of said first prism and to said optical axis, said second lens system focusing a point of the field at a second image point within said second prism, said second prism displacing said second image point by refraction to a third image point outside said second prism and within said first prism, said first prism being positioned to displace said third image point outside said second prism and within said first prism, said first prism being positioned to displace said third image point by refraction through a first image point, said first image point and said third image point being symmetrical to the axis of rotation of said first prism, and a first lens system focusing said image point to said light pickup device.

2. The arrangement of claim 1 wherein the refractive index of the prisms is between 2 and 5.

* * * * *